July 7, 1931.   H. G. SWEARINGEN   1,812,906

ARTIFICIAL BAIT

Filed May 1, 1930

Inventor
Herman G. Swearingen,

By Clarence A. O'Brien
Attorney

Patented July 7, 1931

1,812,906

UNITED STATES PATENT OFFICE

HERMAN G. SWEARINGEN, OF CALIFORNIA, MISSOURI, ASSIGNOR OF ONE-FOURTH TO H. R. POPEJOY AND ONE-FOURTH TO J. R. POPEJOY, BOTH OF CALIFORNIA, MISSOURI

ARTIFICIAL BAIT

Application filed May 1, 1930. Serial No. 448,968.

This invention relates to an improved artificial bait which is generally known in this application as a weedless, automatically operable, casting minnow.

Briefly stated, the novelty is predicated upon a body shaped to represent a small minnow, wherein said body is bifurcated, the furcation constituting the tail portion thereof and forming a sheath to conceal and accommodate the duplex spring hook arrangement.

In accordance with the inventive conception, a receiving pin is arranged intermediate the ends of the furcations in such a position as to permit keeper hooks on the arm portions of the bait hooks to be detachably engaged therewith, the complete bait hook assembly or unit being bodily slidable between the furcations and connected with the fishing line in a manner to release the hooks at the proper time for making the catch.

In the drawings:

In Figure 1 is an elevational view of an artificial minnow constructed in accordance with the present invention with the bait hooks retracted.

Figure 1:
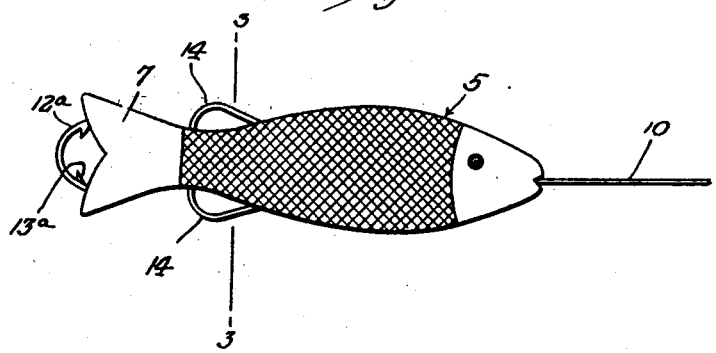
Figure 2:
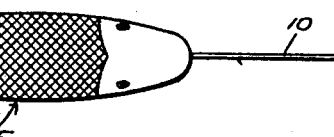
Figure 2 is a top plan view thereof.
Figure 4:
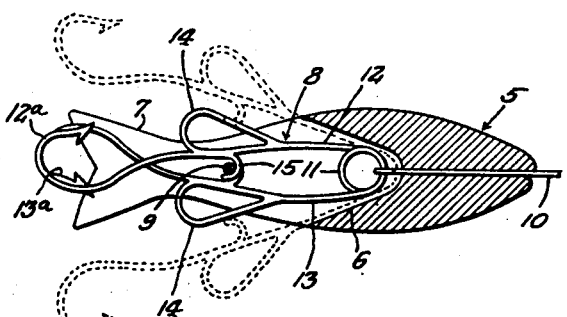
Figure 4 is a longitudinal sectional view showing the operative and ineffective positions of the bait hook element.
Figure 3:
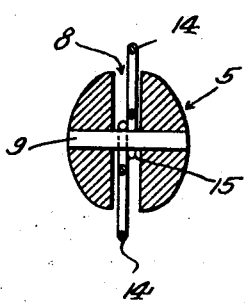
Figure 3 is a cross section taken approximately on the plane of the line 3—3 of Figure 1.

In the drawings, as seen in Figure 4, the numeral 5 designates the body portion. This is shaped, as before indicated, to resemble or represent a small minnow. It is formed with a tapered socket or recess as at 6 and the tail portions are defined by the furcations 7. These furcations co-operate with the recess 6 in defining a seat to accommodate the bait hook unit generally designated by numeral 8. The numeral 9 designates a retaining pin which extends between the furcations at the point represented in Figure 4.

The numeral 10 indicates the line which is slidable back and forth through a passage formed centrally in the body.

The major part of unit 8 comprises a single length of wire which is bent upon itself to form a spring coil as at 11 and a pair of complemental spaced arms 12, and 13 respectively.

The terminal end portions of the arms are disposed in crossed or intersecting relation and bent to provide bait hooks 12a and 13a respectively. The intermediate portions of the arms are provided with suitable finger grips 14. In addition, these portions of the arms are provided with inwardly bent companion keeper hooks 15 which are separably engaged with the retaining pin 9. The complete unit 8 is slidable back and forth in the sheath portion of the body. This sliding motion is accomplished through the medium of the pulling of the line or cord 10 which is connected to the spring coil 11.

After the device is baited, the hooks 15 are engaged with the pins 9 thus holding the arms in intersecting relationship and maintaining the hooks 12a and 13a in folded or contracted state between the furcations 7. This is the feature which substantially conceals the bait hook to a certain extent and prevents the catching of weeds thereon as the device is drawn through the water.

In practice, the fish follows the minnow. Then, by pulling on the line 10, the complete unit 8 is slid forwardly or in a direction to occupy the dotted line position represented in Figure 4, under which circumstances the hooks 15 are disengaged from the pin 9, allowing the arms 12 and 13 to swing outwardly to the expanded state represented in this figure and to enable the catch to be made.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

In an artificial bait of the class described, a body constructed to resemble in its external appearance a minnow, said body being fashioned at one end with a pair of spaced parallel furcations constituting the tail portion of the minnow and defining an intervening sheath, a transverse cross pin carried by said furcations and spanning the space constituting said sheath, said pin being located intermediate the ends of the furcations, a bodily slidable bait hook unit formed from a single length of wire bent upon itself to provide an intermediate spring coil and a pair of companion arms, the end portions of said arms being disposed in intersecting relationship and the terminal portions being fashioned to define a pair of complemental overlapping bait receiving hooks, said hooks extending beyond the tail when in overlapping position, the intermediate portions of said arms being provided with inwardly projecting keeper hooks detachably engageable with said cross pin, said intermediate portions being further provided with outwardly extending finger grips, said body being provided with a longitudinal guide bore communicating with the sheath, a fishing line slidably mounted in said bore and connected at its inner end to the spring coil, whereby to bodily slide said unit with respect to the body at the desired time to release the keeper hook from said retaining pin and to allow the bait hooks to expand.

In testimony whereof I affix my signature.

HERMAN G. SWEARINGEN.